US010510523B2

(12) United States Patent
Kim et al.

(10) Patent No.: US 10,510,523 B2
(45) Date of Patent: Dec. 17, 2019

(54) SURFACE ION TRAP HAVING A TRAPPING LOCATION WHOSE POSITION IS CONTROLLABLE IN THREE DIMENSIONS WITH HIGH PRECISION

(71) Applicant: Duke University, Durham, NC (US)

(72) Inventors: Jungsang Kim, Chapel Hill, NC (US); Andre Van Rynbach, Durham, NC (US); Peter Maunz, Durham, NC (US)

(73) Assignee: Duke University, Durham, NC (US)

( * ) Notice: Subject to any disclaimer, the term of this patent is extended or adjusted under 35 U.S.C. 154(b) by 0 days.

(21) Appl. No.: 16/037,988

(22) Filed: Jul. 17, 2018

(65) Prior Publication Data

US 2019/0057855 A1 Feb. 21, 2019

Related U.S. Application Data

(60) Provisional application No. 62/533,937, filed on Jul. 18, 2017.

(51) Int. Cl.
*H01J 49/42* (2006.01)
*H01J 49/14* (2006.01)
*G06N 10/00* (2019.01)

(52) U.S. Cl.
CPC ............ *H01J 49/424* (2013.01); *G06N 10/00* (2019.01); *H01J 49/142* (2013.01); *H01J 49/426* (2013.01)

(58) Field of Classification Search
CPC ........ H01J 49/424; H01J 49/42; H01J 49/426; G06N 10/00

(Continued)

(56) References Cited

U.S. PATENT DOCUMENTS

2004/0079880 A1* 4/2004 Bateman ............. H01J 49/0418 250/288
2009/0321719 A1* 12/2009 Folman .................. G06N 10/00 257/25

(Continued)

OTHER PUBLICATIONS

Peter F. Herskind et al., "Microfabricated surface ion trap on a high-finesse optical mirror", "Optics Letters", Publisher: Optical Society of America, Aug. 15, 2011, 3045-3047, vol. 36 No. 16, http://dx.doi.org/10.1364/OL.36.003045.

(Continued)

*Primary Examiner* — Nicole M Ippolito
(74) *Attorney, Agent, or Firm* — Kaplan Breyer Schwarz, LLP

(57) ABSTRACT

An ion-trap system having a trapping location that is controllable with nanometer-scale precision in three dimensions is disclosed. The ion-trap system includes an ion trap that includes a pair of RF driver electrodes, a pair of tuning electrodes operably coupled with the RF driver electrodes to collectively generate an RF field having an RF null that defines the trapping location, as well as a plurality of DC electrodes that are operably coupled with the RF driver electrodes and the tuning electrodes. Each tuning electrode is driven with an RF signal whose amplitude and phase is independently controllable. By controlling the amplitudes of the RF signals applied to the tuning electrodes, the height of the trapping location above the mirror is controlled. The position of the tuning location along two orthogonal lateral directions is controlled by controlling a plurality of DC voltages applied to the plurality of DC electrode pads.

21 Claims, 5 Drawing Sheets

(58) Field of Classification Search
USPC ......................................... 250/281, 282, 283
See application file for complete search history.

(56) References Cited

U.S. PATENT DOCUMENTS

| | | | | |
|---|---|---|---|---|
| 2011/0290995 | A1* | 12/2011 | Kumph ............... | H01J 49/0018 250/282 |
| 2013/0068942 | A1* | 3/2013 | Verenchikov ....... | H01J 49/4245 250/282 |

OTHER PUBLICATIONS

P F Herskind et al., “Positioning of the rf potential minimum line of a linear Paul trap with micrometer precision”, “Journal of Physics B: Atomic, Molecular and Optical Physics”, Publisher: IOP Publishing, doi:10.1088/0953-4075/42/15/154008, Jul. 15, 2009, vol. 42.
D. J. Berkeland et al., “Minimization of ion micromotion in a Paul trap”, “Journal of Applied Physics”, Jul. 17, 2018, 5025-5033, vol. 83, No. 10.
Andre Van Rynbach et al., “An integrated mirror and surface ion trap with a tunable trap location”, “Applied Physics Letters”, Publisher American Institute of Physics, 109, http://dx.doi.org/10.1063/1.4970542.
A. P. VanDevender et al., “Efficient Fiber Optic Detection of Trapped Ion Fluorescence”, “Physical Review Letters”, DOI: 10.1103/PhysRevLett.105.023001, Apr. 9, 2010.

* cited by examiner 525-016US1

SURFACE ION TRAP HAVING A TRAPPING LOCATION WHOSE POSITION IS CONTROLLABLE IN THREE DIMENSIONS WITH HIGH PRECISION

CROSS REFERENCE TO RELATED APPLICATIONS

This application claims the benefit of U.S. Provisional Application Ser. No. 62/533,937, filed Jul. 18, 2017, entitled "Systems and Methods for Fine-Tuning the Trapping location in 3 Dimensions in a RF Paul Trap", which is incorporated herein by reference. If there are any contradictions or inconsistencies in language between this application and one or more of the cases that have been incorporated by reference that might affect the interpretation of the claims in this case, the claims in this case should be interpreted to be consistent with the language in this case.

STATEMENT REGARDING FEDERALLY SPONSORED RESEARCH

This invention was made with Government support under Federal Grant No. W911NF-10-1-0213 awarded by the Army Research Office. The Federal Government has certain rights to this invention.

TECHNICAL FIELD

The present disclosure relates to quantum computing systems in general, and, more particularly, to quadrupole ion traps used in a quantum computing systems.

BACKGROUND

Quantum computing is an emerging technology that leverages a quantum mechanical phenomenon not available in classical systems (e.g., superposition and entanglement, etc.) to process information. In a conventional computing system, the basic unit of information is a bit, which is a two-state element that can be in either a "one" or a "zero" state. In contrast, the basic unit of information in a quantum-computing system, referred to as a qubit, can be in any superposition of both states at the same time (referred to as "superposition states"). Furthermore, many qubits can be in a superposition of correlated states in a way that the system cannot be described as a product of the individual qubit states (referred to as "entangled states"). These forms of qubit states representing the information are not available in conventional (classical) computers. As a result, theoretically, a large-scale quantum computer can solve some problems that simply are not practically feasible using conventional computing approaches. Unfortunately, quantum computers have proven difficult to realize in large scale due.

One attractive avenue for realizing practical quantum computing is "trapped-ion processing," in which atomic ions are trapped in a free-space position via a quadrupole ion trap (a.k.a. an RF Paul Trap). The position of the trap location is determined by the RF field null in the electric field generated by the RF signals applied to a plurality of RF driver electrodes that define the ion trap. Once trapped, the ions are addressed and read-out optically using one or more optical signals.

Ideally, collection of entangled photons emitted form a trapped ion would be done via photonic interconnects monolithically integrated with the ion trap itself, where the photonic interconnects could then be optically coupled with conventional single-mode optical fibers. This would enable a pair of atomic ion qubits to be entangled in two remote locations and create distributed entangled states for a quantum network. By distributing entangled qubit pairs over several individual quantum processing units, the limitation on the total number of trapped ions that can be combined into a single processing unit could be overcome.

Unfortunately, the integration of optical elements (e.g., mirrors, lenses, optical fibers, photonic interconnects, etc.), with ion traps having highly accurate ion positioning capability has proven challenging. The development of ion traps integrated with small-volume optical cavities, however, has led to improved system performance due to a more efficient photon collection platform that improves entanglement generation rates between remote ions and faster quantum state detection.

For example, the trap location within an optical-cavity-based ion trap is precisely positioned at an antinode of the cavity mode in order to maximize the coupling strength between the ion and the cavity. The trap location is characterized by a vanishing of the radio frequency (RF) field, called the RF null, which is determined by the geometry of the RF electrodes. For a linear surface trap, for example, the height of the trapping location above the substrate (i.e., trap height) is determined by the spacing and width of its linear RF electrodes. Unfortunately, fabrication tolerances during fabrication of the ion trap limits the precision with which an antinode can be located, thereby giving rise to errors in antinode position that degrade ion-trap performance from its theoretical maximum.

Furthermore, ion motion synchronous with the varying amplitude of the RF-based electric field can give rise to "micromotion" of a trapped ion. Unfortunately, micromotion can lead to positional shifts in trap location that are several orders of magnitude larger than desirable, thereby reducing the efficiency of photon collection from an ion trap. Mitigation of micromotion by establishing a static electric field via an arrangement of DC electrodes added to the ion trap has been demonstrated in the prior art. Such micromotion compensation ensures that the ion sits at the null of the RF field formed due to the RF voltages by adjusting DC voltages applied at the DC electrodes to push the ions to the exact RF null. Typically, the generated static electric field is kept constant to avoid perturbations that can push the ion to an area with finite RF fields, thereby leading to micromotion.

An ion trap having three-dimensional control over the position of its trapping location without causing micromotion would be a significant advance in the state of the art of quantum computing and quantum communications.

SUMMARY

The present disclosure enables practical, large-scale quantum computers without some of the costs and disadvantages of the prior art. Embodiments in accordance with the present disclosure employ quadrupole ion traps having integrated optical cavities, where the height of the trap location is electronically controlled with nanometer-scale precision and with little or no micromotion. As a result, such embodiments could enable practical integration of surface ion traps and photonic interconnects.

Ion traps of the prior art have an electrode arrangement that includes a set of RF driver electrodes, a set of RF "tuning" electrodes, and multiple DC electrode pads for mitigating micromotion of a trapped ion. A single RF signal source provides an RF signal, a portion of which is provided to each RF electrode. This RF signal is split via an adjustable capacitive-coupling network such that the RF voltages at the tuning electrodes can have a different amplitude than the RF voltages at the RF driver electrodes. Trap height is controlled with micron-scale precision by controlling the relative amplitudes of the RF signal at the two sets of RF electrodes. Micromotion is mitigated by establishing a static electric field from the DC electrodes to ensure that the ion sits at the null of the RF field formed due to the RF voltages applied at the RF driver and tuning electrodes.

In stark contrast to the prior art, ion traps in accordance with the present disclosure provide independently controllable RF signals to a pair of RF tuning electrodes and each of a pair of RF driver electrodes, where each of the RF signals is provided by a different RF signal source. The use of separate RF sources enables control over both the amplitude and phase of each RF signal, which enables control of trap height, as well as the lateral position of the trap location relative to the geometry of the electrode structure (or any other structure fabricated with respect to the electrodes), with nanometer-scale precision and without imparting micromotion. In some embodiments, the RF driver electrodes are electrically connected such that they are driven with the same RF signal.

An illustrative embodiment is a linear ion-trap system comprising a surface ion trap and a set of RF driver circuits for driving the electrodes of the surface trap. The electrode arrangement includes a pair of linear DC electrodes, a pair of RF driver electrodes located on either side of the inner DC electrodes, a pair of tuning electrodes located on either side of the RF driver electrodes, and a plurality of DC electrode pads that are arranged outside each of the tuning electrodes along their length. Each RF driver electrode is driven with a first RF signal that has a first amplitude, one of the tuning electrodes is driven with second RF signal whose amplitude is independently controllable, and the other tuning electrode is driven with a third RF signal whose amplitude is also independently controllable. All of the RF signals are at substantially the same frequency. In some embodiments, each RF driver electrode is driven with different, independently controllable RF signal.

The trap height is controlled by controlling the amplitude of the second and third RF signals relative to the first RF signal. Furthermore, by controlling the relative amplitudes of the second and third RF signals, the position of the trapping location along a first lateral direction can be controlled. Still further, the position of the trapping location along a second lateral direction that is orthogonal to the first lateral direction can be controlled by controlling a plurality of DC voltages applied to a plurality of DC electrode pads that are operatively coupled with the RF driver and tuning electrodes.

The inclusion of independent RF signals whose phase can each be independently controlled with respect to one another enables compensation for complex impedance differences between the different RF-driven electrodes that can give rise to substantial phase shifts between the RF driver electrodes and the tuning electrodes, which can result in undesirable micromotion. Furthermore, a "negative" amplitude RF signal can effectively be applied by shifting the phase by 180 degrees.

An embodiment in accordance with the present disclosure is an ion-trap system that generates a trapping location having a position that is controllable in three dimensions, the position having a first component along a first direction, a second component along a second direction, and a third component along a third direction, the first, second, and third directions being orthogonal, and the ion-trap system comprising: (1) a surface ion trap that includes an electrode arrangement disposed on the surface of a substrate, the electrode arrangement comprising: (i) a first RF driver electrode; (ii) a second RF driver electrode; (iii) a first tuning electrode; and (iv) a second tuning electrode; wherein the electrode arrangement collectively generates an electric field having a first RF null that defines the trapping location; (2) a first RF driver circuit that is configured to drive at least one of the first and second RF driver electrodes with a first RF signal having a first amplitude, a first frequency, and a first phase; (3) a second RF driver circuit that is configured to drive the first tuning electrode with a second RF signal having a second amplitude that is independently controllable with respect to the first amplitude; and (4) a third RF driver circuit that is configured to drive the second tuning electrode with a third RF signal having a third amplitude that is independently controllable with respect to each of the first and second amplitudes; wherein the first direction is normal to the surface, and wherein the first component is based on at least the second amplitude and the third amplitude.

Another embodiment in accordance with the present disclosure is a method for controlling a position of a trapping location of an ion trap, the position having a first component along a first direction, a second component along a second direction, and a third component along a third direction, the first, second, and third directions being orthogonal, and the method comprising: (1) driving a first RF driver electrode with a first RF signal having a first amplitude, first frequency, and first phase, wherein the first RF driver electrode is disposed on a surface of a substrate; (2) driving a second RF driver electrode with a second RF signal having a second amplitude, the first frequency, and a second phase, the second RF electrode being disposed on the surface; (3) driving a first tuning electrode with a third RF signal that is independent of the first RF signal, the third RF signal having a third amplitude that is independently controllable with respect to the first amplitude, the first tuning electrode being disposed on the surface; (4) driving a second tuning electrode with a fourth RF signal that is independent of the first RF signal, the fourth RF signal having a fourth amplitude that is independently controllable with respect to the first amplitude; and (5) controlling the first component, wherein the first direction is orthogonal with the surface, and wherein the first component is controlled by controlling a first difference between the first amplitude and at least one of the third amplitude and fourth amplitude; wherein the first RF driver electrode, second RF driver electrode, first tuning electrode, and second tuning electrode are configured such that the first RF signal, second RF signal, third RF signal and fourth RF signal collectively define an electric field having an RF null that defines the trapping location.

DETAILED DESCRIPTION

Figure 1A:
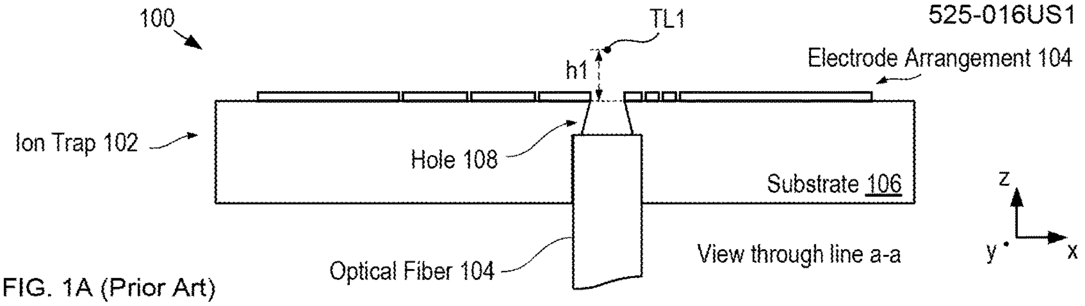
FIG. 1A (Prior Art)
FIGS. 1A-B depict schematic drawings of sectional and top views, respectively, of an ion-trap detection system comprising a surface ion-trap and integrated optical fiber in accordance with the prior art.
Figure 1B:
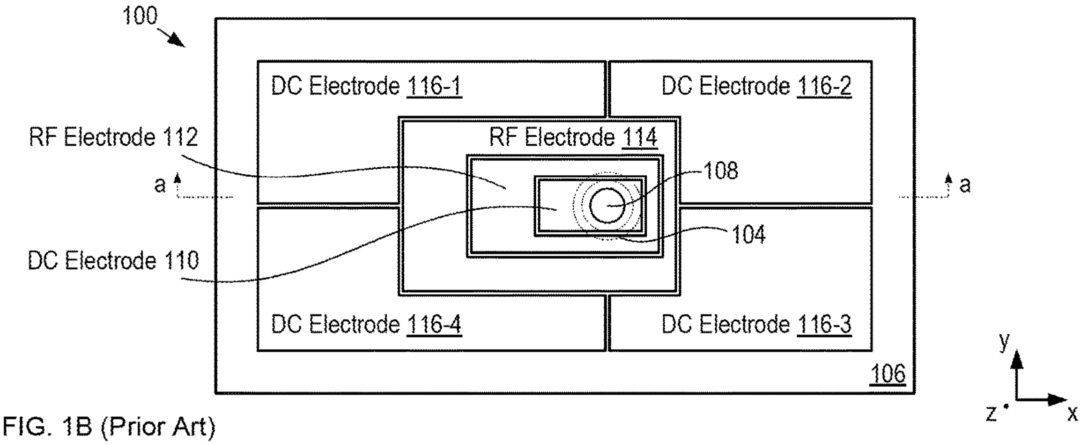
FIG. 1B (Prior Art)

FIGS. 1A-B depict schematic drawings of sectional and top views, respectively, of an ion-trap detection system comprising a surface ion-trap and integrated optical fiber in accordance with the prior art. System 100 includes ion trap 102 and optical fiber 104. The sectional view depicted in FIG. 1A is taken through line a-a shown in FIG. 1B.

Ion trap 102 is a surface Paul ion trap that includes through-hole 108, which is configured to locate optical fiber 104 such that the optical fiber can interrogate the ion trap. Ion trap 102 is defined by electrode arrangement 104 disposed on the surface of substrate 106.

Electrode arrangement 104 includes DC electrode 110, inner RF electrode 112, outer RF electrode 114, and DC electrodes 116-1 through 116-4.

In operation, inner RF electrode 112 and outer RF electrode 114 are independently driven to realize trapping location TL1 for the ion trap. Typically, the electric field generated by the RF signals is designed to form an RF null where the ion(s) should be trapped. However, presence of ambient static electric fields can push the ions away from this RF null, which can give rise to undesirable micromotion. As a result, to mitigate micromotion, DC electrodes 110 and 116-1 through 116-4 are driven with a set of DC voltages that provide a static electric field to cancel this ambient static field and position the ion(s) at the RF null.

The height, h1, of trapping location TL1 above substrate 106 can be controlled with micron-scale precision based on the relative potentials of the RF signals provided to the inner and outer RF electrodes. For example, when inner RF electrode 112 is driven and outer electrode 114 is grounded, h1 is 30 microns above the substrate and centered above hole 108. When this driving configuration is reversed, h1 is 90 microns. When both RF electrodes are driven with the same potential, h1 is 50 microns.

Unfortunately, lateral control of the location of the trapping location (i.e., its position in the x-y plane) cannot be achieved with system 100 because any change in the set of potentials provided to DC electrodes 110 and 116-1 through 116-4 that pushes the ion laterally will necessarily position the ion away from the RF null, thereby causing micromotion.

In accordance with the present disclosure, however, vertical and lateral control over the position of the trapping location of a surface ion trap can be achieved without inducing significant micromotion.

Figure 2A:
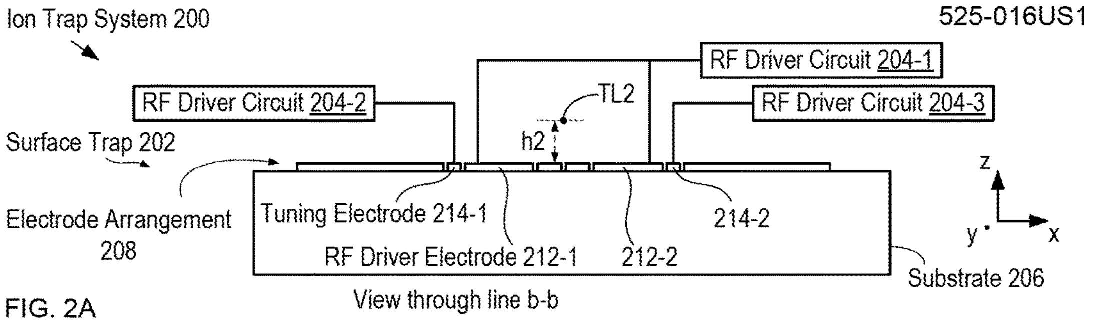
FIGS. 2A-B depict schematic drawings of sectional and top views, respectively, of an illustrative embodiment of a surface ion-trap system in accordance with the present disclosure.
Figure 2B:
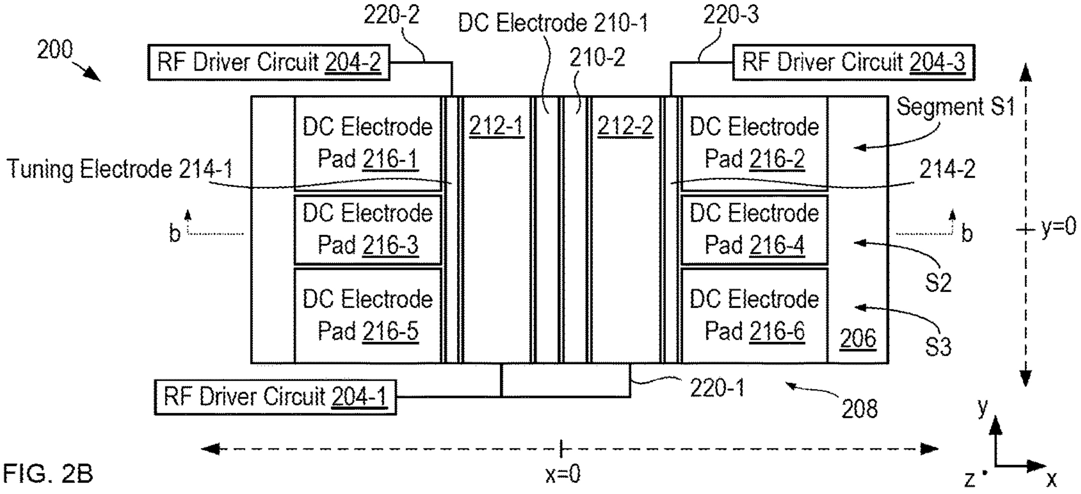

FIGS. 2A-B depict schematic drawings of sectional and top views, respectively, of an illustrative embodiment of a surface ion-trap system in accordance with the present disclosure. The sectional view depicted in FIG. 2A is taken through line b-b shown in FIG. 2B. System 200 includes surface trap 202 and RF driver circuits 204-1 through 204-3. System 200 is analogous to ion-trap systems described by A. Van Rynback, et al., in "An integrated mirror and surface ion trap with tunable trap location," in *App. Phys. Lett.*, Vol. 109, pg. 221108-1 (2016), which is incorporated herein by reference.

Figure 3:
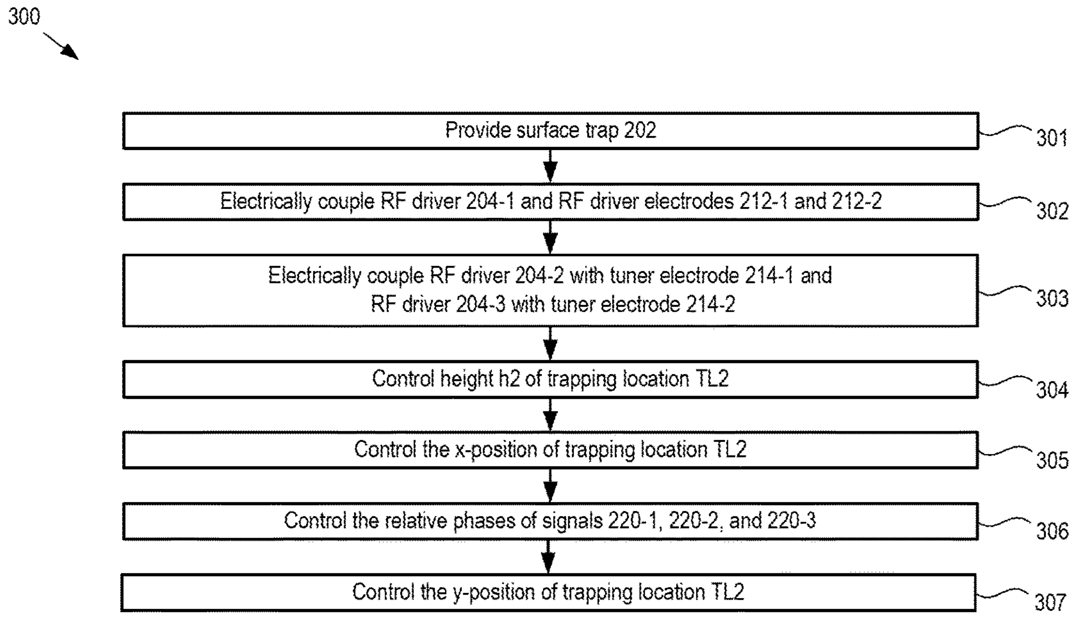
FIG. 3 depicts operations of a method for controlling the position of a trapping location of a surface ion trap in three-dimensions in accordance with the illustrative embodiment.

FIG. 3 depicts operations of a method for controlling the position of a trapping location of a surface ion trap in three-dimensions in accordance with the illustrative embodiment. Method 300 begins with operation 301, wherein surface trap 202 is provided.

Surface trap 202 is a linear surface ion trap that includes substrate 206 and electrode arrangement 208, which is disposed on the top surface of substrate 206.

Substrate 206 is a fused-silica substrate suitable for planar processing. Although in the depicted example, substrate 206 comprises fused-silica, any suitable material can be used in substrate 206 without departing from the scope of the present disclosure. It should be noted that the top surface of substrate 206 must be electrically insulating to avoid shorting the electrodes of electrode arrangement 208; therefore, in embodiments in which substrate 206 includes a conducting or semiconducting material, its top surface is typically coated with an insulating material such as silicon dioxide, silicon nitride, and the like.

Electrode arrangement 208 includes inner DC electrodes 210-1 and 210-2, driver RF electrodes 212-1 and 212-2, tuning electrodes 214-1 and 214-2, and DC electrode pads 216-1 through 216-6. In the depicted example, each of the electrodes of electrode arrangement 208 includes a layer of gold having a thickness of approximately 350 nm disposed on an adhesion layer of titanium having a thickness of approximately 20 nm. It should be noted that any suitable electrically conductive material or materials can be used to form any of the electrodes in electrode arrangement 208.

Inner DC electrodes 210-1 and 210-2 (referred to, collectively, as DC electrodes 210) are formed such that they are lines of electrically conductive material, typically having a width within the range of approximately 10 microns to 500 microns and are separated by a spacing sufficient to mitigate electrical coupling between them—typically within the range of approximate 0.5 microns to approximately 20 microns. In the depicted example, each of inner DC electrodes 210 has a width of approximately 22.5 microns and they are separated by approximately 5 microns. In some embodiments, only a single inner DC electrode is included in surface trap 202. Some embodiments in accordance with the present disclosure include more than two inner DC electrodes. In some embodiments, at least one inner DC electrode includes a plurality of independently addressable electrode sections arranged along the axial direction of an ion trap.

Each of RF driver electrodes 212-1 and 212-2 (referred to, collectively, as driver electrodes 212) is a line of electrically conductive material having a width typically within the range of 20 microns to 500 microns. The RF driver electrodes are formed such that they lie on either side of inner DC electrodes 210 and are separated from the inner DC electrodes by a spacing sufficient to mitigate electrical coupling between them. In the depicted example, each of driver electrodes 212 has a width of approximately 57 microns and are separated from each other by a distance of approximately 60 microns.

Tuning electrodes 214-1 and 214-2 (referred to, collectively, as tuning electrodes 214) are located on either side of RF driver electrodes 212 such that the tuning and RF driver electrodes are operatively coupled and the electric fields generated by driving them are coupled. In the depicted example, each of tuning electrodes 214 has a width of approximately 20 microns; however, tuning electrodes 214 can have any suitable width without departing from the scope of the present disclosure.

In some embodiments, tuning electrodes 214 are located between RF driver electrodes 212.

In some embodiments, at least one of electrodes 210, 212, and 214 includes at least a portion that projects above substrate 206 more or less than other electrodes.

DC electrode pads 216-1 through 216-6 (referred to, collectively, as DC electrode pads 216) are substantially rectangular electrodes that are arranged in pairs on either side of tuning electrodes 214 to define segments S1, S2, and S3, which are arranged along the length of the tuning electrodes. Segment S1 includes DC electrode pads 216-1 and 216-2, segment S2 includes DC electrode pads 216-3 and 216-4, and segment S3 includes DC electrode pads 216-5 and 216-6. It should be noted that the shape and distribution of DC electrode pads 216, relative to the other electrodes of electrode arrangement 208, are matters of design choice. For example, although the depicted example includes three segments, each including a pair of rectangular DC electrode pads located outside of tuning electrodes 212, a different number of segments can be included and/or at least one of DC electrode pads 216 can have a shape other than rectangular and/or be located other than outside a tuning electrode (e.g., between a tuning electrode and its corresponding RF driver electrode, etc.) without departing from the scope of the present disclosure.

For example, in some embodiments:

i. at least one of DC electrode pads 216 is located between the RF driver electrodes 212 and the RF tuning electrodes 214; or ii. at least one of DC electrode pads 216 is located inside both the RF driver electrodes 212 and RF tuning electrodes 214; or iii. at least one of DC electrodes 210 is segmented into a plurality of electrode pads such that it functions in an analogous fashion to DC electrode pads 216; or iv. multiple sets of electrode pads are included (e.g., one set between the RF electrodes and another set outside the RF electrodes, etc.) to enable flexible control of the DC trapping potential; or v. any combination of i, ii, iii, and iv In some embodiments, RF driver electrodes 212 are segmented into a plurality of electrode pads that define RF driver segments arranged along the y-direction such that each RF driver segment is operatively coupled with a different one of segments S1 through S3.

The inclusion of DC electrode pads 216 enables confinement of trapped ions along the axial direction (i.e., the y-axis as shown). By applying adequate DC voltages on these electrode pads, (1) trapping potentials of highly flexible shape (harmonic traps, quartic traps, etc.) can be created along the axial direction, and (2) the principal axes of each of the traps can be rotated in the x-z plane. Furthermore, the voltages applied to the DC electrode pads can be finely controlled to shift the location of the trap along the axial direction (y-axis). In some embodiments, the location of different segments is altered along the axial direction of linear trap 202—for example, the DC electrode pads of some segments are located between tuning electrodes 214 and RF driving electrodes 212, while the DC electrode pads of other segments are located outside of tuning electrodes 214.

It should be noted that the dimensions and dimensional ranges provided for electrode arrangement 208 are merely exemplary and that myriad alternative electrode arrangements can be used without departing from the scope of the present disclosure.

Electrode arrangement 208 can be formed on the top surface of substrate 206 in any suitable fashion. In the depicted example, electrode arrangement 208 is formed via a "lift-off" process in which e-beam evaporation is used to deposit the layers of the titanium and gold over a pattern of photoresist that exposes the surface of the substrate in regions where the electrodes are desired. Once the metal layers are deposited, an extended soak in acetone is used to remove the photoresist regions and the metal that deposited on the photoresist. Other methods suitable for forming electrode arrangement 208 in accordance with the present disclosure include: forming a mold on substrate 206 via conventional photolithography followed by electro- or electroless plating to build up the electrode material, subtractive processes in which conductive material is blanket deposited on substrate 206, followed by selective etching of the material, and the like.

At operation 302, RF driver 204-1 is electrically coupled with RF driver electrodes 212-1 and 212-2.

RF driver circuit 204-1 is a conventional RF driver circuit that provides signal 220-1 to each of RF driver electrodes 212-1 and 212-2. In the depicted example, RF driver circuit 204-1 includes an amplification stage comprising a resonant LC circuit that provides output signal 220-1 such that it has an amplitude that is typically within the range of approximately 50 V to approximately 1,000 V and a resonance frequency typically within the range of approximate 5 MHz to approximately 200 MHz. The choice of amplitude and frequency is based on the specific trap desired as well as the target ion to be trapped. In the depicted example, output signal 220-1 has an amplitude of approximately 200 V and a frequency of approximately 40 MHz; however, any suitable RF driver circuit can be used to provide signal 220-1 to driver electrodes 212.

At operation 303, RF drivers 204-2 and 204-3 are electrically coupled with tuner electrodes 214-1 and 214-2, respectively.

RF driver circuit 204-2 is an independently controllable, high-bandwidth, high-slew-rate operational amplifier with a sinusoidal voltage output generated by a direct digital synthesizer (DDS) to provide signal 220-2 to tuning electrode 214-1. RF driver circuits 204-2 is configured such that it can independently control each of the phase and frequency of signal 220-2. In the depicted example, the amplitude of signal 220-2 is digitally controllable via a 10-bit number between 0 and 1023.

In similar fashion, RF driver circuit 204-3 is an independently controllable, high-bandwidth, high-slew-rate operational amplifier with a sinusoidal voltage output generated by a direct digital synthesizer (DDS) that provides signal 220-3 to tuning electrode 214-2. RF driver circuits 204-3 is also configured such that it can independently control each of the phase and frequency of signal 220-3 in the same manner as described above.

In some embodiments, at least one of RF driver circuits 204-1 and 204-2 includes a different suitable RF signal generator, such as a programmable waveform generator, etc.

It should be noted that, preferably, the frequencies of output signals 220-1, 220-2, and 220-3 are matched to the same frequency.

It should be noted that the use of a separate RF driver circuit for RF driver electrodes 212 and each of tuning electrodes 214 affords embodiments in accordance with the present disclosure substantial advantages of ion-trap systems of the prior art. For example, it enables continuous adjustment of the trap height with a resolution of a few nanometers by independently tuning the relative voltage amplitude between the signals applied to the RF driver electrodes 212-1 and 212-2 and tuning electrodes 214-1 and 214-2. Furthermore, an ability to tune trap height h2 with fine resolution affords significant advantages to other structures, such as standing-wave laser gates, optimally coupling ions to an optical cavity integrated with a surface trap, optimally coupling ions to an optical cavity inherently integrated with the surface trap, and multi-well traps that employ analogous control approaches.

At operation 304, height h2 of trapping location TL2 is controlled by controlling the amplitude of signals 220-1, 220-2, and 220-3. In the depicted example, h2 is 50 microns when signal 220-1 has a voltage amplitude of 185 V and each of signals 220-2 and 220-3 is zero. The value of h2 increases linearly with the amplitude of signals 220-2 and 220-3 with a slope of approximately 37 nm/V when the signals have frequency and phase matched to those of signal 220-1. It should be noted that the relationship between trap height and the voltage amplitudes of signals 220-1, 220-2, and 220-3 depends upon the specific design of surface trap 202.

At operation 305, the position of trapping location TL2 along the x-axis is controlled. The x-position of the trap location is controlled by controlling the relative amplitudes of signals 220-2 and 220-3.

At operation 306, the phase difference between signal 220-1 and each of signals 220-2 and 220-3 is controlled.

In some embodiments, keeping the relative phases between these signals low is critically important to avoid micromotion of the trapped ion due to variation in the position of the RF null of the aggregate electric field. In some cases, the phases of the RF signals on each of the RF driver and tuning electrodes can shift due to, for example, complex impedance conditions, etc. The ability to independently control the phase of each of output signals 220-1, 220-2, and 220-3 enables these shifts to be compensated for, which affords embodiments in accordance with the present disclosure significant advantage over the prior art.

Furthermore, by imparting a 180° phase shift on output signals 220-2 and 220-3, relative to output signal 220-1, the height h2 of ion trap location TL2 can be reduced.

At operation 307, the position of trap location TL2 is controlled along the y-direction by controlling the DC voltages applied to DC electrode pads 216.

The arrangement of inner DC electrodes 210, RF driver electrodes 212, tuning electrodes 214, and DC electrode pads 216 can be reconfigured in myriad ways without departing from the scope of the present disclosure. For example, embodiments in accordance with the present disclosure include, without limitation:

i. only one inner DC electrode 210; or
ii. no inner DC electrodes; or
iii. more than two inner DC electrodes 210; or
iv. more or fewer DC electrode pads 216; or
v. one or more DC electrode pads that are between tuning electrodes 214; or
vi. tuning electrodes 214 located between RF driving electrodes 212; or
vii. a mirror aperture embedded within its electrode arrangement; or
viii. any combination of i, ii, iii, iv, v, vi, and vii.

It has been shown in the prior art that the integration of optical cavity modes with surface ion traps has the potential to enable significant performance improvements in ion-trapping systems. When an ion is substantially optimally coupled to a cavity mode, interaction between the ion and photons can be enhanced dramatically. This is particularly beneficial in applications such as quantum computing and quantum communications, quantum cryptography, and the like.

The benefits of enabling strong ion-photon interaction in a surface trap include:

i. detection of ion states by state-dependent fluorescence, where one of the atomic states scatter photons and the other state does not;
ii. enhanced coupling of ions with the cavity mode to improve the efficiency of the detection of scattered photons, thereby improving the accuracy and speed of the state detection process; and
iii. generation of ion-photon entanglement, where a degree of freedom for the photon emitted by the ion, such as polarization, frequency or phase, is inherently entangled with the internal state of the atom after the photon is emitted. Such entanglement is a critical mechanism for building quantum interface between a memory qubit (represented by the ions) and a communication qubit (represented by the photon). The success rate of the ion-photon entanglement can be dramatically improved by improving the coupling of the atomic emission into the cavity mode.

Figure 4:
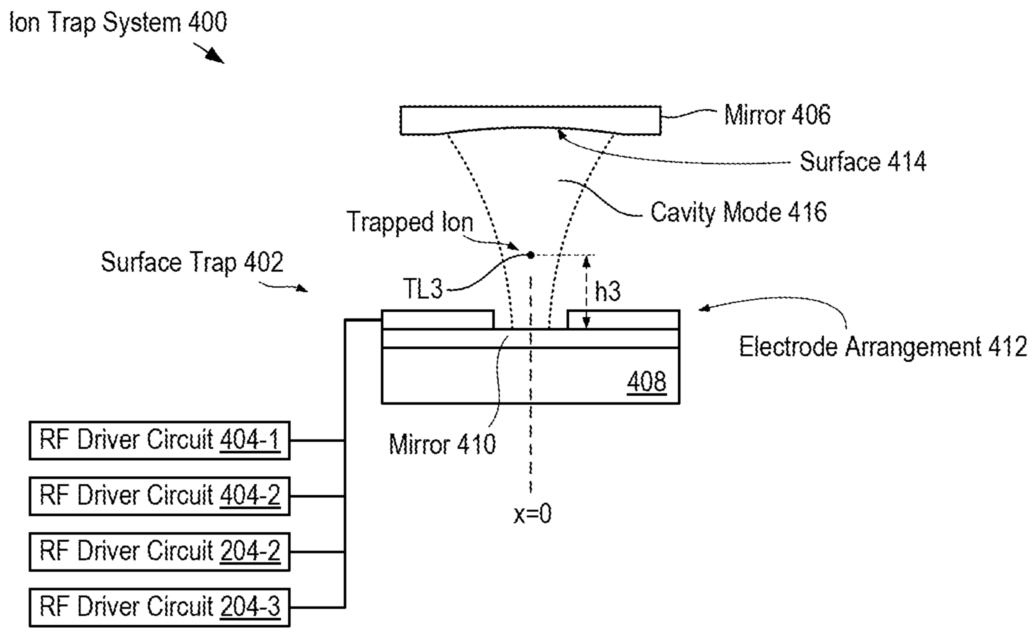
FIG. 4 depicts a schematic drawing of a side view of an alternative embodiment of an ion-trap system in accordance with the present disclosure.

FIG. 4 depicts a schematic drawing of a side view of an alternative embodiment of an ion-trap system in accordance with the present disclosure. Ion trap system 400 includes surface trap 402, RF driver circuits 404-1, 404-2, 204-2, and 204-3, and mirror 406.

Figure 5A:
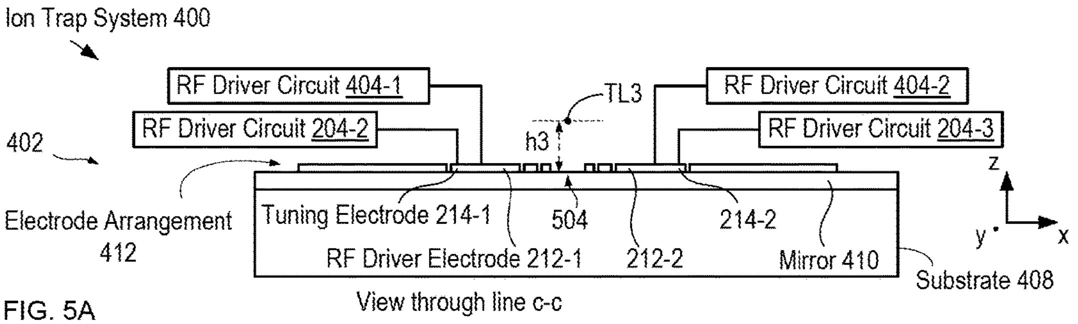
FIGS. 5A-B depict schematic drawings of cross-sectional and top views, respectively, of surface trap 402.
Figure 5B:
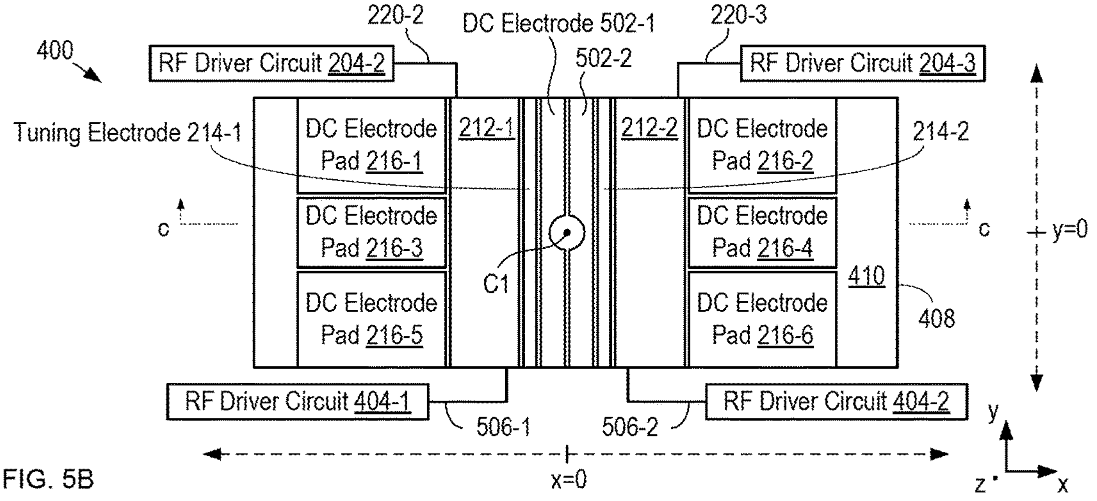

FIGS. 5A-B depict schematic drawings of cross-sectional and top views, respectively, of surface trap 402. The cross-sectional view shown in FIG. 5A is taken through line c-c of FIG. 5B. Description of ion trap system 400 is provided herein with continuing reference to FIGS. 4, 5A, and 5B.

Surface trap 402 comprises substrate 408, mirror 410, and electrode arrangement 412, which is disposed on the top surface of mirror 410.

Substrate 408 is a conventional substrate suitable for planar processing. In the depicted example, substrate 408 is a fused silica substrate; however, any material can be used in substrate 408 without departing from the scope of the present disclosure.

Mirror 410 is multi-layer dielectric reflector (e.g., a Bragg mirror) formed in conventional fashion on the top surface of substrate 408. In the depicted example, mirror 410 is highly reflective for ultraviolet (UV) light characterized by a wavelength of 369.5 nm. In some embodiments, mirror 410 is designed for operation at a different wavelength.

Electrode arrangement 412 includes inner DC electrodes 502-1 and 502-2, driver RF electrodes 212-1 and 212-2, tuning electrodes 214-1 and 214-2, and DC electrode pads 216-1 through 216-6. In the depicted example, each of the electrodes of electrode arrangement 412 includes a layer of gold having a thickness of approximately 350 nm disposed on an adhesion layer of titanium having a thickness of approximately 20 nm. It should be noted that any suitable electrically conductive material or materials can be used to form any of the electrodes in electrode arrangement 412.

Inner DC electrodes 502-1 and 502-2 (referred to, collectively, as DC electrodes 502) are formed such that they collectively define mirror aperture 504.

Mirror aperture 504 is a substantially circular opening in DC electrodes 502 centered at origin C1, which is located at x=0 and y=0. It should be noted that the size and location of aperture 504 is a matter of design choice. Typically, it is preferable for mirror aperture 504 to limit the size of the mirror area exposed that the trapped ion is exposed to while simultaneously mitigate clipping losses of cavity mode 416. In the depicted example, inner DC electrodes have a width of approximately 22.5 microns and define a mirror aperture that is 24 microns in diameter; however, any suitable design of DC electrodes 502 and aperture 504 can be used without departing from the scope of the present disclosure.

In contrast to electrode arrangement 208, in electrode arrangement 412, tuning electrodes 214 are located between inner DC electrodes 502 and RF driver electrodes 212 such that tuning electrode 214-1 resides between DC electrode 502-1 and RF driver electrode 212-1 and tuning electrode 214-2 resides between DC electrode 502-2 and RF driver electrode 212-2.

RF driving circuits 404-1 and 404-2 are analogous to RF driving circuit 204-1; however, RF driving circuits 404-1 and 404-2 are electrically connected with RF driver electrodes 212-1 and 212-2, respectively, such that each RF driver electrode can be driven independently of the other. RF driving circuits 404-1 and 404-2 provide output signals 506-1 and 506-2, respectively.

Mirror 406 is bulk reflector having concave reflective surface 414. In the depicted example, surface 414 is highly reflective for UV light characterized by a wavelength of 369.5 nm. In some embodiments, surface 414 is configured for operation at a different wavelength.

Mirror 410 and surface 414 collectively give rise to optical cavity mode 416, providing the potential for integration of photonic interconnects to collect entangled photons emitted from trapped ions with high efficiency and fidelity.

It will be apparent to one skilled in the art that the optical coupling of an atomic ion and a cavity mode strongly depends on the position of the atomic ion within the cavity mode. Along the direction of the cavity axis (i.e., the z-direction as shown), a standing wave is formed where the spacing of the node and the anti-node is determined by the wavelength λ that corresponds to the atomic transition of interest (λ/2). Optimal coupling occurs when the atomic ion is located exactly on the anti-node of the cavity mode, which requires fine-tuning the height of the trap location (RF null) to coincide with the anti-node of the cavity.

In the depicted example and as discussed above with respect to ion-trap system 200, the position of trapping location TL3 is controlled in three-dimensions with nanometer-scale precision by a combination of control over the relative amplitudes and phases of the RF voltages applied to RF driver electrodes 212, tuning electrodes 214, inner DC electrodes 502, and DC electrode pads 216.

It should be noted that, in some cases, the radius of the cavity mode at the ion location (typically given by a Gaussian beam shape) can be very small (0.5-5 micron). As a result, the optical coupling between the ion and the cavity mode can degrade quickly if the ion is shifted radially from the center of the cavity mode, even if it is aligned at the anti-node axially. The ability to control the lateral position of a trapped ion to locate the ion at the center of the cavity mode radially affords embodiments in accordance with the present disclosure significant advantage over prior-art ion trapping systems.

It is to be understood that the disclosure teaches just some examples of embodiments in accordance with the present disclosure and that many alternative embodiments can easily be devised by those skilled in the art after reading this disclosure and that the scope of the present invention is to be determined by the following claims.

What is claimed is:

1. An ion-trap system that generates a trapping location having a position that is controllable in three dimensions, the position having a first component along a first direction, a second component along a second direction, and a third component along a third direction, the first, second, and third directions being orthogonal, and the ion-trap system comprising:

(1) a surface ion trap that includes an electrode arrangement disposed on the surface of a substrate, the electrode arrangement comprising:
   (i) a first RF driver electrode;
   (ii) a second RF driver electrode;
   (iii) a first tuning electrode; and
   (iv) a second tuning electrode;
   wherein the electrode arrangement collectively generates an electric field having a first RF null that defines the trapping location;
(2) a first RF driver circuit that is configured to drive at least one of the first and second RF driver electrodes with a first RF signal having a first amplitude, a first frequency, and a first phase;
(3) a second RF driver circuit that is configured to drive the first tuning electrode with a second RF signal having a second amplitude that is independently controllable with respect to the first amplitude; and
(4) a third RF driver circuit that is configured to drive the second tuning electrode with a third RF signal having a third amplitude that is independently controllable with respect to each of the first and second amplitudes;

wherein the first direction is normal to the surface, and wherein the first component is based on at least the second amplitude and the third amplitude.

2. The ion-trap of claim 1 wherein the second component is based on the second amplitude and the third amplitude.

3. The ion-trap of claim 2 wherein the electrode arrangement further includes a plurality of DC electrode pads, and wherein the third component is based on a plurality of DC voltages applied to the plurality of DC electrode pads.

4. The ion-trap of claim 1 wherein the first and second tuning electrodes are between the first and second RF driver electrodes.

5. The ion-trap of claim 1 wherein the first and second RF driver electrodes are between the first and second tuning electrodes.

6. The ion-trap of claim 1 further including a fourth RF driver circuit, wherein the first RF driver circuit is configured to drive the first RF driver electrode with the first RF signal, and wherein the fourth RF driver circuit is configured to drive the second RF driver electrode with a fourth RF signal having a fourth amplitude, a fourth frequency, and a fourth phase.

7. The ion-trap of claim 1 wherein the second RF signal and the third RF signal have the first frequency.

8. The ion-trap of claim 1 wherein the electrode arrangement further includes at least one DC electrode that is located between the first and second RF driver electrodes and between the first and second tuning electrodes.

9. The ion-trap of claim 1 further comprising a first mirror, wherein the surface includes a second mirror, the electrode arrangement including a mirror aperture, and wherein the first mirror and second mirror are arranged to define an optical cavity having a cavity mode for a first light signal, and further wherein the optical cavity and the electrode arrangement are configured to couple the trapping location and the cavity mode.

10. The ion-trap of claim 1 wherein the second RF driver is further configured to control a second phase of the second RF signal independently of the first phase, and wherein the third RF driver is further configured to control a third phase of the third RF signal independently of the first phase and second phase.

11. The ion-trap of claim 1 wherein the first RF driver circuit includes a resonant circuit characterized by a first inductance and a first capacitance, wherein the resonant circuit is characterized by a first resonance frequency that is based on the first inductance and the first capacitance.

12. The ion-trap of claim 1 wherein the second RF driver circuit includes a first direct-digital synthesizer.

13. A method for controlling a position of a trapping location of an ion trap, the position having a first component along a first direction, a second component along a second direction, and a third component along a third direction, the first, second, and third directions being orthogonal, and the method comprising:

(1) driving a first RF driver electrode with a first RF signal having a first amplitude, first frequency, and first phase, wherein the first RF driver electrode is disposed on a surface of a substrate;

(2) driving a second RF driver electrode with a second RF signal having a second amplitude, the first frequency, and a second phase, the second RF electrode being disposed on the surface;

(3) driving a first tuning electrode with a third RF signal that is independent of the first RF signal, the third RF signal having a third amplitude that is independently controllable with respect to the first amplitude, the first tuning electrode being disposed on the surface;

(4) driving a second tuning electrode with a fourth RF signal that is independent of the first RF signal, the fourth RF signal having a fourth amplitude that is independently controllable with respect to the first amplitude; and (5) controlling the first component, wherein the first direction is orthogonal with the surface, and wherein the first component is controlled by controlling a first difference between the first amplitude and at least one of the third amplitude and fourth amplitude;

wherein the first RF driver electrode, second RF driver electrode, first tuning electrode, and second tuning electrode are configured such that the first RF signal, second RF signal, third RF signal and fourth RF signal collectively define an electric field having an RF null that defines the trapping location.

14. The method of claim 13 further comprising (6) controlling the second component by controlling a second difference between the third and fourth amplitudes.

15. The method of claim 14 further comprising (7) controlling the third component by controlling a plurality of DC voltages applied to a plurality of DC electrode pads that are operatively coupled with the first RF driver electrode and the first and second tuning electrodes.

16. The method of claim 13 further comprising an electrode arrangement that includes the first RF driving electrode, second RF driving electrode, first tuning electrode and second tuning electrode such that the first and second RF driver electrodes are between the first and second tuning electrodes.

17. The method of claim 13 further comprising (6) providing an electrode arrangement that includes the first RF driving electrode, second RF driving electrode, first tuning electrode and second tuning electrode such that the first and second tuning electrodes are between the first and second RF driver electrodes.

18. The method of claim 13 further comprising (6) providing an electrode arrangement that includes the first RF driving electrode, second RF driving electrode, first tuning electrode, second tuning electrode, and at least one DC electrode that is located between the first and second RF driver electrodes and between the first and second tuning electrodes.

19. The method of claim 13 further comprising:

(6) forming an optical cavity having a cavity mode, wherein the optical cavity resides between a first mirror and a second mirror that is located in the first plane; and (7) coupling the trapping location and the cavity mode.

20. The method of claim 13 wherein at least one of the third RF signal and fourth RF signal is provided by an RF driver circuit that includes a direct-digital synthesizer.

21. The method of claim 13 wherein the first RF signal and second RF signal are the same RF signal.

* * * * *